(12) United States Patent
Spennemann et al.

(10) Patent No.: US 8,404,994 B2
(45) Date of Patent: Mar. 26, 2013

(54) LASER BEAM WELDING DEVICE AND METHOD

(75) Inventors: Klaus Spennemann, Jihlava (CZ); Sonja Kittel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1002 days.

(21) Appl. No.: 12/305,509

(22) PCT Filed: Dec. 3, 2007

(86) PCT No.: PCT/EP2007/063182
§ 371 (c)(1),
(2), (4) Date: Apr. 28, 2009

(87) PCT Pub. No.: WO2008/080731
PCT Pub. Date: Jul. 10, 2008

(65) Prior Publication Data
US 2009/0294417 A1    Dec. 3, 2009

(30) Foreign Application Priority Data

Dec. 27, 2006  (DE) .......................... 10 2006 061 622
Jul. 30, 2007  (DE) .......................... 10 2007 035 717

(51) Int. Cl.
*B23K 26/06* (2006.01)
*B23K 26/073* (2006.01)
(52) U.S. Cl. .......... 219/121.63; 219/121.64; 219/121.79
(58) Field of Classification Search ........................ None
See application file for complete search history.

(56) References Cited

U.S. PATENT DOCUMENTS

| | | | |
|---|---|---|---|
| 3,419,321 A | 12/1968 | Barber et al. | |
| 4,275,288 A | 6/1981 | Makosch et al. | |
| 4,327,277 A * | 4/1982 | Daly | 219/121.64 |
| 4,636,611 A | 1/1987 | Penney | |
| 4,658,109 A | 4/1987 | Honeycutt et al. | |
| 5,281,211 A * | 1/1994 | Parel et al. | 606/5 |
| 5,326,956 A * | 7/1994 | Lunney | 219/121.69 |
| 5,490,849 A * | 2/1996 | Smith | 606/5 |
| 5,583,342 A * | 12/1996 | Ichie | 250/459.1 |
| 5,660,748 A | 8/1997 | Tanaka et al. | |
| 5,938,952 A * | 8/1999 | Lin et al. | 219/121.64 |

(Continued)

FOREIGN PATENT DOCUMENTS

| | | |
|---|---|---|
| CN | 1583346 | 2/2005 |
| DE | 20 2005 015 263 | 9/2005 |

(Continued)

OTHER PUBLICATIONS

International Search Report, PCT/EP2007/063182, dated Apr. 9, 2008.

(Continued)

*Primary Examiner* — Kiley Stoner
(74) *Attorney, Agent, or Firm* — Kenyon & Kenyon LLP

(57) ABSTRACT

A laser beam welding device and a laser beam welding method are described. It is provided that a laser beam converted to have an annular cross-sectional area by using an optical system is deflected for the purpose of producing a radial weld.

15 Claims, 1 Drawing Sheet

U.S. PATENT DOCUMENTS

| | | | |
|---|---|---|---|
| 5,963,359 A * | 10/1999 | Shinozaki et al. | 359/326 |
| 6,210,399 B1 * | 4/2001 | Parel et al. | 606/5 |
| 6,636,535 B1 | 10/2003 | Iwashita et al. | |
| 7,102,118 B2 * | 9/2006 | Acker et al. | 250/216 |
| 2004/0156029 A1 * | 8/2004 | Hansen | 355/67 |
| 2005/0077276 A1 | 4/2005 | Chen | |
| 2006/0000812 A1 | 1/2006 | Weber et al. | |
| 2007/0068019 A1 | 3/2007 | Kallabis | |
| 2009/0020069 A1 * | 1/2009 | Standifer et al. | 117/204 |
| 2009/0266802 A1 * | 10/2009 | Sawabe et al. | 219/121.67 |
| 2010/0282722 A1 * | 11/2010 | Ramsayer et al. | 219/121.64 |

FOREIGN PATENT DOCUMENTS

| | | |
|---|---|---|
| JP | 54-152299 | 11/1979 |
| JP | 11-153754 A * | 6/1999 |
| JP | 2001-138084 | 5/2001 |
| JP | 2003-1474 | 1/2003 |
| JP | 2003-48092 | 2/2003 |
| JP | 2004-66281 | 3/2004 |
| JP | 2004066281 | 3/2004 |
| JP | 2004-98163 | 4/2004 |
| JP | 2005-177859 | 7/2005 |

OTHER PUBLICATIONS

DIALOG® File 351: Derwent WPI, AN 2004-273937, XP002471536, Laser Irradiation Apparatus Detects Light Reflected From Target Transmitted by Condenser Through Circulator, and Performs Focusing Adjustment of Condenser Based on Detection Result; Mitsubishi Cable Ind Ltd., Pat. No. JP 20040066281 A, Mar. 4, 2004.

* cited by examiner

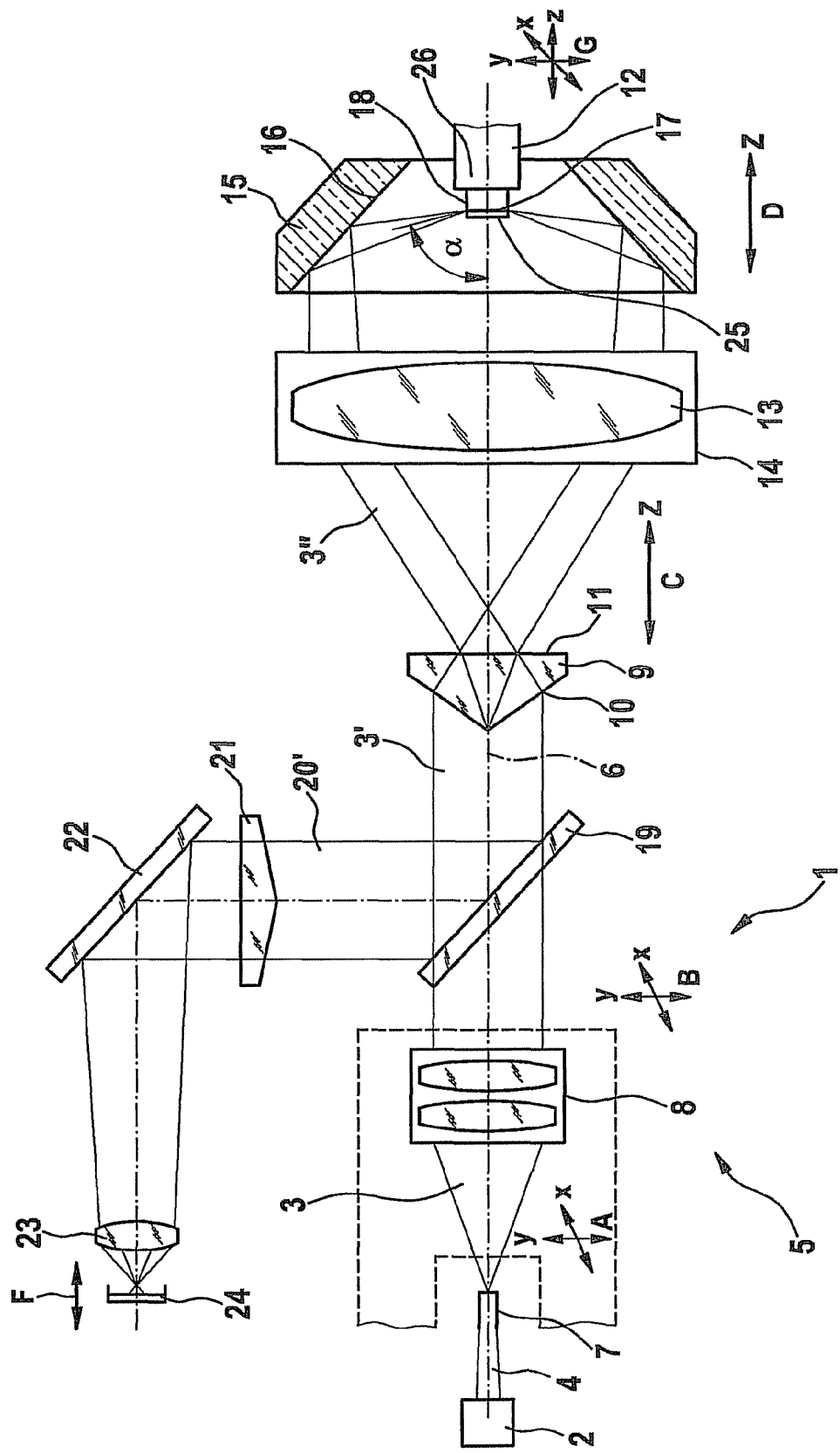

LASER BEAM WELDING DEVICE AND METHOD

FIELD OF INVENTION

The present invention relates to a laser beam welding device and a laser beam welding method.

BACKGROUND INFORMATION

In known laser beam welding devices, a laser beam generated by a laser beam source is focused on the joining zone between two workpieces. The cross section of the focused laser beam is circular, the focus diameter ranging between 150 μm and 600 μm in conventional applications. The absorption of the laser beam into the material results in heating and melting in the joining zone. The molten material is mixed together as a function of the joint geometry and material properties, resulting in a connection between the joining partners after solidification. To produce a weld, a relative movement is generated between the laser beam or laser welding focus and the tool, i.e., either the laser beam or the workpiece is moved at a defined feed rate. For example, to produce a circumferential weld (radial weld) on the lateral surfaces of two cylindrical components, the components are rotated around their axes of symmetry by a rotating device, while the laser beam source, and therefore the circular laser beam welding focus, remains stationary. The machining time is limited, among other things, by the influence of the centrifugal force, which increases as the machining speed increases, resulting in an unwanted ejection of molten material from the joining zone. A further problem in known laser beam welding devices is the fact that the workpieces must be twisted by more than 360° if the circumferential weld to be produced must be tight, i.e., if the circumferential weld must be closed in the circumferential direction. The welding angle is therefore larger than 360°, which produces a weld overlap zone which is formed due to the fact that the laser beam welding focus passes over this zone a second time. This weld asymmetry causes the component to warp, as a result of which the component does not run true or even bends. This may result in functional impairment or even failure of the component, in particular if the component is a fuel injector.

A laser beam welding device is also described in German Patent Application No. DE 20 2005 015 263 U1 in which a plurality of laser diodes is situated in an annular configuration for the purpose of generating an annular laser beam focus. The disadvantages of this arrangement are the large number of laser diodes required and the fact that it appears to be difficult to achieve a uniform intensity distribution in the region of the laser beam welding focus, making it impossible to dispense with rotating the joining partners or the laser diode arrangement when producing a circumferential weld.

SUMMARY OF THE INVENTION

An object of the present invention is therefore to specify a laser beam welding device and a laser beam welding method which may be used to generate a laser beam having an annular cross section, preferably using only one laser beam source, the laser beam having at least an approximately uniform intensity distribution. The device and the method should be suitable, in particular, for producing a circumferentially enclosed radial weld without an overlap zone to avoid warping of the component as a result of an asymmetrical weld formation.

The present invention is based on the idea of using the optical system to convert the laser beam generated by the laser beam source and usually having a circular intensity distribution to a laser beam having an annular intensity distribution, i.e., an annular cross-sectional area. Only one laser beam source is preferably used for this purpose, the laser beam converted by the optical system and having an annular cross section having a uniform intensity distribution over its active cross-sectional area. The annular cross-sectional area is preferably designed to have a circular annular contour, this, however, not being absolutely necessary, depending on the shape of the optical components. For example, an oval annular shape is also conceivable.

According to a refinement of the present invention, it is advantageously provided that the annular laser beam generated by the optical system is directed onto the joining zone between two workpieces in an essentially radial direction, thereby producing a circumferential weld or a radial weld. In doing this, the deflection does not necessarily have to be precisely radial, i.e., at a 90° angle to the optical axis of the laser beam generated by the laser beam source or to the longitudinal axis or axis of symmetry of the components to be welded, but instead this deflection may be carried out within an angle range of $0°<\alpha<180°$ (depending on the geometric conditions). It is advantageous that the laser beam be deflected onto the side of the at least one workpiece (i.e., onto the lateral surface). It is preferable if the laser beam, which is closed in the circumferential direction, strikes the joining zone at least approximately perpendicularly. The use of a laser beam welding device designed in this manner makes it possible to produce a circumferentially enclosed circumferential weld which does not have an overlap zone, thereby avoiding warping of the component. Energy is supplied to the joining zone homogeneously and simultaneously along the entire length of the weld. Furthermore, it is not necessary to produce a relative movement between the laser beam source or the laser beam focus and the at least one workpiece, which increases the process speed, since negative influences of centrifugal forces are eliminated. The laser beam welding device is suitable, in particular, for welding warping-critical, cylindrical components having diameters in the range of <60 mm, it also being possible, however, to easily weld together components having larger diameters by using correspondingly powerful lasers.

According to a preferred embodiment of the present invention, the deflecting means for deflecting the laser beam, in particular for deflecting it onto the lateral surface of at least one cylindrical component, is designed as a conical mirror. The positioning of the mirror surface on an inner side of the cone is advantageous, since this enables the conical mirror to be situated so that it surrounds the outside of the workpiece at least in areas, enabling it to be easily adjustable. The conical mirror is preferably irradiated from the direction of the cone base. However, it is also conceivable to use, in addition or as an alternative, a conical mirror having an external mirror surface which is preferably able to be moved into at least one component, it being possible to produce a circumferentially enclosed circumferential weld on the inside of the workpiece. In this case, the conical mirror is preferably irradiated from the direction of the cone tip. The selection of the cone angle enables the angle of incidence of the annular laser beam to be set on the side of the at least one workpiece. The conical mirror is preferably situated coaxially to an optical axis of the laser beam welding device. This is preferably a rotationally symmetrical conical shape. Deviations from the conical shape make it possible to act upon a joining zone having a non-circular shape.

Moving the conical mirror in the axial direction changes the diameter of the laser beam focus ring, which is thus adjustable to the diameter of the at least one, in particular, rotationally symmetrical workpiece to be machined.

To generate a laser beam having an annular cross-sectional area, at least one axicon is provided according to a refinement of the present invention. An axicon is an optical element which is conical in shape at least in some sections. The axicon is preferably situated in such a way that is it adjustable at least in the axial direction, thereby making it possible to vary the angle of incidence of the laser beam focus ring on the at least one workpiece.

A collimator which is used to generate a parallel beam, which is then forced into a ring shape by the axicon, is suitably situated in the beam path, upstream from the axicon. The collimator is preferably adjustable in relation to an optical axis in both the vertical direction and the horizontal direction, thereby ensuring a uniform intensity distribution over the laser beam cross section.

To generate a laser beam ring which is focused on the joining area, at least one focusing system having at least one focusing lens is provided, which is preferably situated between the axicon and the conical mirror. The joining zone is preferably situated directly in the focal point of the focusing system.

In a refinement of the present invention, it is advantageously provided that a pulsed laser beam source is used as the laser beam source. This makes it possible to achieve a high power output and a short pulse duration. Good results have been achieved using pulsed energy in the range of approximately 150 J at a pulse duration of approximately 50 ms. In particular when using pulse beam sources, a heat conduction welding process takes place in which the material melts and radial welds having an aspect ratio (depth to width) of approximately 1:1 are formed. It is also conceivable to implement deep penetration welding processes to produce a vapor capillary having an aspect ratio >1:1.

The laser beam generated, in particular, by the pulsed laser beam source is preferably fed into the optical system by an optical waveguide. The optical waveguide is advantageously adjustable in relation to the optical axis both vertically and horizontally to be able to center the overall system and eliminate possible tilting of the focus ring with regard to the optical axis of the laser beam welding device.

To monitor the process, it is advantageous to use a beam splitter to split a monitoring beam path off from the process beam path and supply it, in particular, to a digital camera. To capture the entire machining range, an axicon is also preferably placed within the monitoring beam path. The alignment of the camera in the axial direction enables the camera image to be set, it being necessary to ensure adequate illumination to improve the image. The subject matter of the present invention also deals with a welding method in which a, in particular, circular laser beam is converted to an annular laser beam. The laser welding method is preferably carried out using the laser beam welding device described above.

According to a refinement of the present invention, the welding method includes, as a process step, the deflection of the laser beam having an annular cross-sectional area onto a workpiece for the purpose of producing a radial weld. The angle of incidence onto the lateral surface of the workpiece may be selected between $0° < \alpha < 180°$, depending on the application and geometric conditions. The angle of incidence is preferably set by selecting the cone angle of a conical mirror used as the deflecting means and/or by positioning an axicon.

There is preferably no relative movement between the workpiece and the laser beam source or the annular laser beam welding focus during the welding process; the workpiece and laser beam source are therefore situated in a stationary manner relative to one another.

BRIEF DESCRIPTION OF THE DRAWINGS

FIG. 1 shows the schematic structure of a laser beam welding device for producing a radial weld.

DETAILED DESCRIPTION

FIG. 1 shows a laser beam welding device 1, which may also be used to harden workpieces. The laser beam welding device includes a laser beam source 2, which generates a pulsed laser beam 3 having a circular cross-sectional area. Laser beam 3 is fed into an optical system 5 along an optical axis 6 (z axis), using an optical waveguide 4. Output area 7 of optical waveguide 4 is adjustable vertically and horizontally (along the y axis and x axis) in relation to the optical axis (arrow direction A). This makes it possible to center laser beam 3. Widened laser beam 3 strikes a collimator 8 of optical system 5, which is situated at a distance from output area 7 of optical waveguide 4 and parallelizes laser beam 3. Collimator 8 is vertically and horizontally adjustable in relation to the optical axis (z axis) along the y axis and the x axis, which achieves a uniform distribution of the intensity of laser beam 3' (movement in arrow direction B). Parallel-directed laser beam 3' strikes an axicon 9, which is situated at a distance from collimator 8 in the axial direction and has a conical impingement surface 10 and a flat radiation surface 11 situated transversally to the beam path.

Axicon 9 is adjustable in the axial direction along optical axis 6 (arrow direction C/z axis), which enables an angle of incidence α, to be explained further below, onto two workpieces 12, 25 (cover 25 and base member 12) positioned adjacent to each other in the axial direction, which are adjustable in all spatial directions (arrow direction G), using an adjusting system which is not shown, to be varied.

Axicon 9 is used to convert parallel-directed laser beam 3' having a circular cross-sectional area to a laser beam 3" having a circular annular cross-sectional area, which radiates through a focusing system 14 having a focusing objective 13 and strikes a conical mirror 15 which is positioned axially at a distance in the axial direction and has an inner mirror surface 16. Conical mirror 15 deflects annular laser beam 3" radially into the interior at an angle α to optical axis 6 on a lateral joining zone 17 of workpieces 12, 25. Cylindrical workpieces 12, 25 and focusing system 14 are situated at a distance from each other in such a way that annular laser beam 3" is focused on lateral joining zone 17 of workpieces 12, 25. Moving conical mirror 15 along optical axis 6 (arrow direction D) makes it possible to vary the diameter of generated laser beam welding focus ring 26. By selecting the cone angle, angle of incidence α of the laser beam is settable on workpiece 12 relative to optical axis 6 or the axis of symmetry of workpieces 12, 25. The laser beam or laser beam focus ring acting simultaneously upon entire joining zone 17 produces a uniform, symmetrical circumferential weld.

Instead of conical mirror 15 having inner mirror 16, a conical mirror having an outer conical surface (not shown) may also be used. The latter is preferably inserted into workpieces 12, 25 so that the laser beam is deflected radially to the outside, rather than radially to the inside, as shown.

For monitoring purposes and, in particular, for computer-supported evaluation and, if necessary, adjustment of individual optical elements, a beam splitter 19, which generates a parallel monitoring laser beam path 20', is inserted into the beam path between collimator 8 and axicon 9. This monitoring laser beam path 20' strikes a second axicon 21 and is supplied to a digital camera 24 via a mirror 22 and a focusing lens 23. The monitoring laser beam path also has a circular shape in the digital camera due to second axicon 21. For the purpose of optimum focusing, digital camera 24 is situated in such a way that it is adjustable in the axial direction (arrow direction F).

What is claimed is:

1. A laser beam welding device for welding together workpieces, comprising:
    a laser beam source; and
    an optical system situated in a laser beam path, the optical system including:
        an axicon situated in a repositionable manner for converting a laser beam generated by the laser beam source to a laser beam having an annular cross-sectional area, and
        a collimator situated in a repositionable manner in the laser beam path upstream from the axicon for generating a parallel beam.

2. The laser beam welding device according to claim 1, wherein the optical system includes deflecting means configured to deflect the laser beam having the annular cross-sectional area to produce a circumferential weld.

3. The laser beam welding device according to claim 2, wherein the deflecting means is a conical mirror.

4. The laser beam welding device according to claim 3, wherein the conical mirror is situated in a repositionable manner.

5. The laser beam welding device according to claim 1, wherein the optical system includes at least one focusing system.

6. The laser beam welding device according to claim 1, wherein the laser beam source is configured to generate a pulsed laser beam.

7. The laser beam welding device according to claim 1, further comprising:
    an optical waveguide configured to feed the laser beam generated by the laser beam source to the optical system.

8. The laser beam welding device according to claim 1, further comprising:
    a beam splitter configured to split off a monitoring laser beam path from the laser beam path; and
    a process monitoring system including at least one camera situated to capture the monitoring laser beam path.

9. A laser beam welding method, using a laser beam welding device for welding together workpieces, the device including a laser beam source, and an optical system situated in a laser beam path, the method comprising:
    converting a laser beam generated by the laser beam source to a laser beam having an annular cross-sectional area using an axicon situated in a repositionable manner; and
    generating a parallel beam from the laser beam having an annular cross-sectional area using a collimator situated in a repositionable manner in a laser beam path upstream from the axicon.

10. The laser beam welding method according to claim 9, further comprising:
    deflecting the laser beam having the annular cross-sectional area to produce a radial weld.

11. The laser beam welding method according to claim 9, further comprising:
    welding together the workpieces, each having a cylindrical cross section.

12. The laser beam welding method according to claim 9, further comprising:
    situating non-rotatingly the laser beam source and the workpieces to be welded during the welding process.

13. The laser beam welding device according to claim 4, wherein the conical mirror is respositionable in an axial direction.

14. The laser beam welding device according to claim 5, wherein the at least one focusing system is situated in a repositionable manner.

15. The laser beam welding device according to claim 7, wherein the optical waveguide is situated in a repositionable manner.

* * * * *

UNITED STATES PATENT AND TRADEMARK OFFICE
CERTIFICATE OF CORRECTION

PATENT NO.       : 8,404,994 B2                                   Page 1 of 1
APPLICATION NO.  : 12/305509
DATED            : March 26, 2013
INVENTOR(S)      : Spennemann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this
First Day of September, 2015

Michelle K. Lee
*Director of the United States Patent and Trademark Office*